(12) United States Patent
Djachiachvili

(10) Patent No.: US 6,850,351 B1
(45) Date of Patent: Feb. 1, 2005

(54) METHOD AND APPARATUS FOR ULTRA-FAST APERTURE EXPOSURE

(75) Inventor: Iouri N. Djachiachvili, Albuquerque, NM (US)

(73) Assignee: Team Specialty Products Corp., Albuquerque, NM (US)

( * ) Notice: Subject to any disclaimer, the term of this patent is extended or adjusted under 35 U.S.C. 154(b) by 78 days.

(21) Appl. No.: 10/372,474

(22) Filed: Feb. 20, 2003

(51) Int. Cl.[7] ............................................. G02B 26/02
(52) U.S. Cl. ...................... 359/233; 352/215; 396/471; 396/495
(58) Field of Search ................................. 359/227, 233, 359/234, 235; 352/141, 214, 215, 216; 396/246, 247, 471, 493, 495

(56) References Cited

U.S. PATENT DOCUMENTS

| 3,434,213 | A | | 3/1969 | Colbow et al. |
|---|---|---|---|---|
| 3,735,687 | A | | 5/1973 | Park |
| 4,057,810 | A | | 11/1977 | Iwata |
| 4,301,476 | A | | 11/1981 | Keller et al. |
| 4,398,801 | A | | 8/1983 | McWilliams et al. |
| 4,408,338 | A | | 10/1983 | Grobman |
| 4,515,173 | A | | 5/1985 | Zimmermann et al. |
| 4,536,069 | A | | 8/1985 | Kunica |
| 4,571,629 | A | | 2/1986 | Horio et al. |
| 4,576,456 | A | | 3/1986 | Okino et al. |
| 4,581,515 | A | | 4/1986 | Egashira |
| 4,616,911 | A | | 10/1986 | Zeth et al. |
| 4,743,108 | A | | 5/1988 | Vogel et al. |
| 5,159,382 | A | | 10/1992 | Lee et al. |
| 5,255,117 | A | * | 10/1993 | Cushman ..................... 359/234 |
| 5,539,488 | A | | 7/1996 | Erickson et al. |
| 5,850,277 | A | | 12/1998 | Dang et al. |
| 6,305,797 | B1 | | 10/2001 | Otto et al. |
| 6,663,561 | B2 | * | 12/2003 | Sugimoto et al. ........... 600/160 |

\* cited by examiner

*Primary Examiner*—Mark A. Robinson
(74) *Attorney, Agent, or Firm*—Rod D. Baker; Peacock Myers & Adams, P.C.

(57) ABSTRACT

An apparatus and method for extremely fast opening and closing of an exposure path or optical axis. Two disk-shaped shutters are coaxially rotated in opposite directions at an initial synchronous speed so as to dynamically align openings in the discs at an angular position offset from the exposure path. The angular speeds of two of the disks are selectively increased and decreased to dynamically align the openings with the exposure path. A third masking disk may be provided, which rotates coaxially with the other two at a constant angular speed less than the angular speeds of the other two disks, to permit the invention to rapidly open and close two or more separate optical paths.

15 Claims, 9 Drawing Sheets

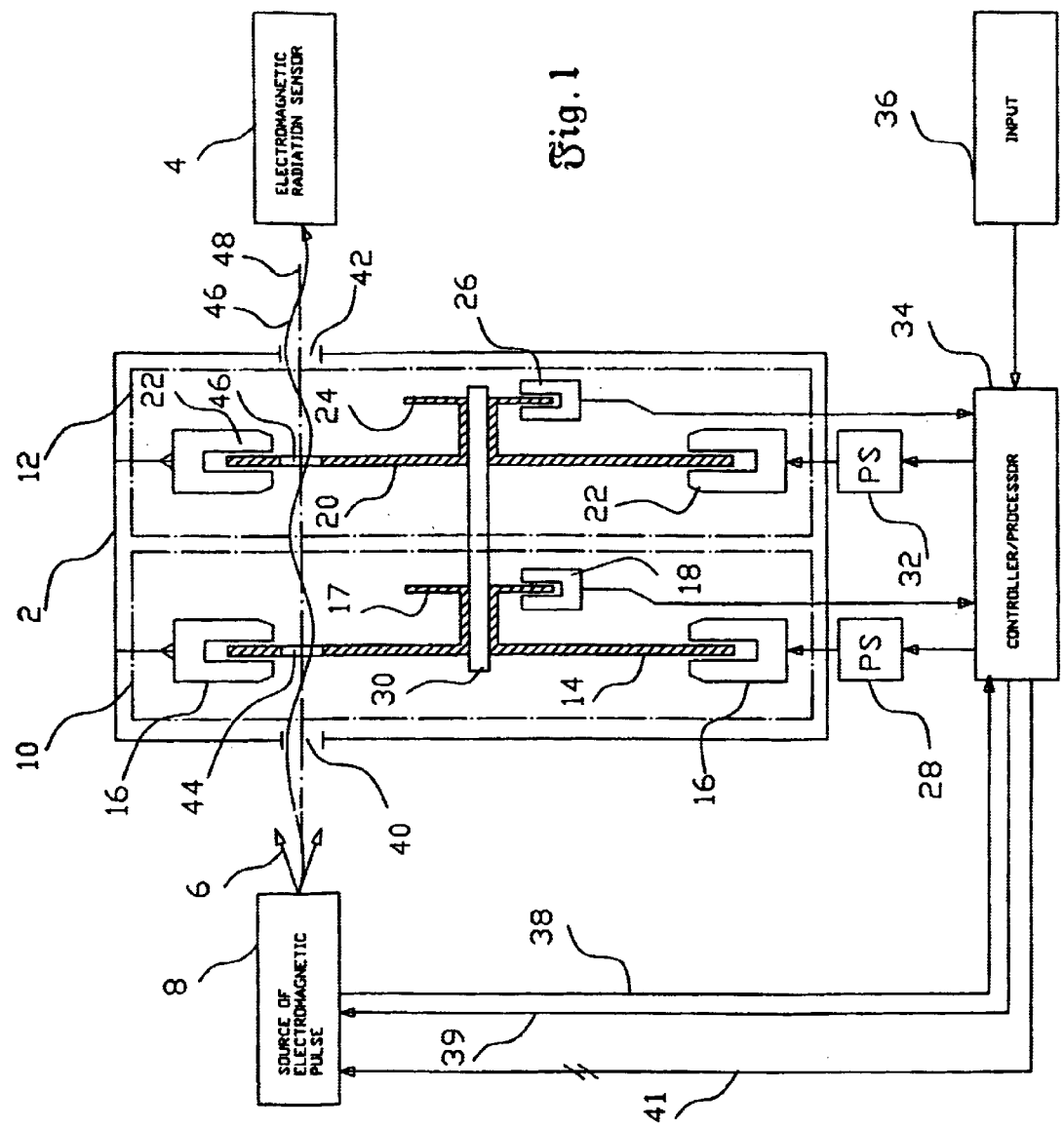

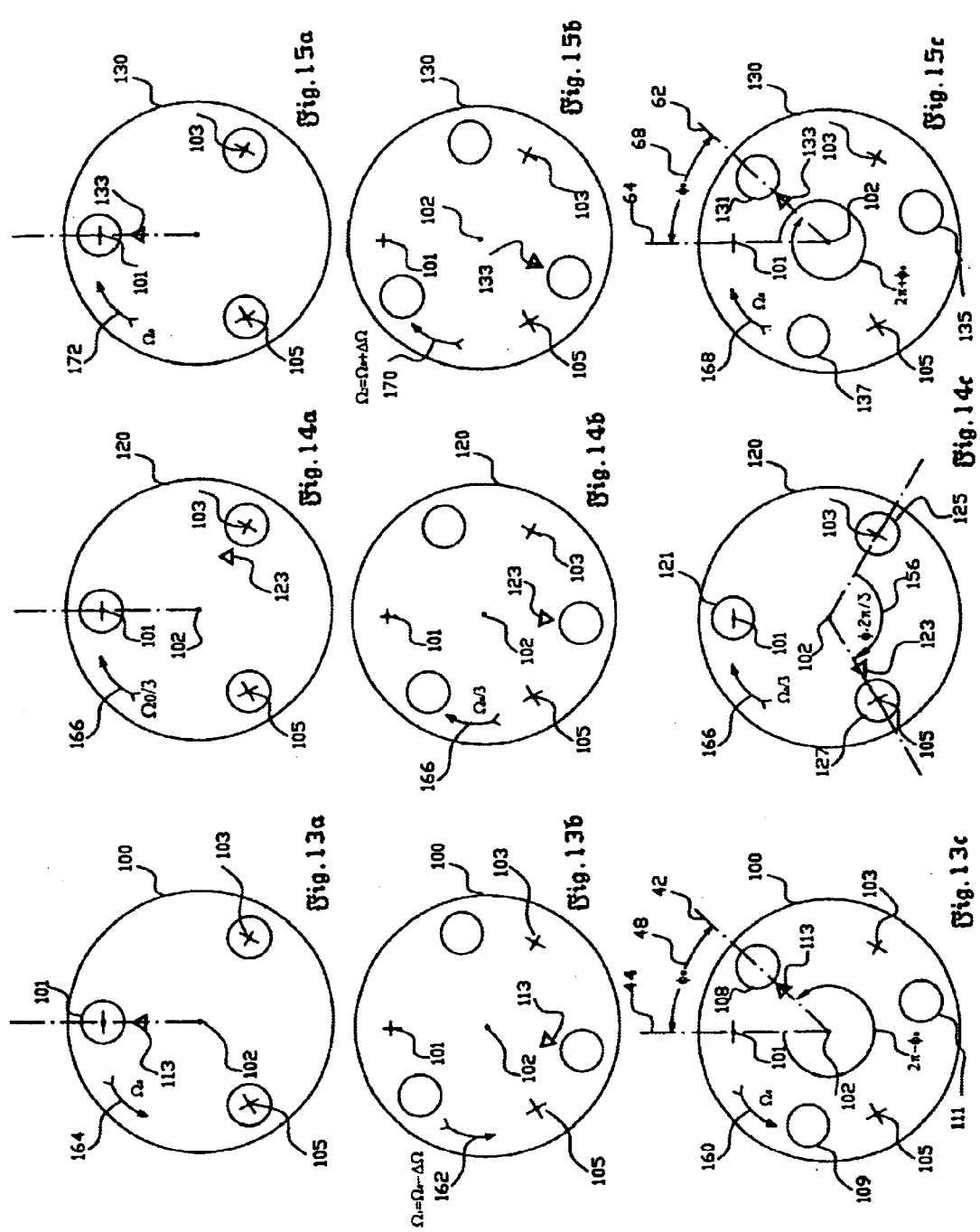

METHOD AND APPARATUS FOR ULTRA-FAST APERTURE EXPOSURE

BACKGROUND OF THE INVENTION

1. Field of the Invention (Technical Field)

The present invention relates to aperture shutters, particularly to fast mechanical shutters, and specifically to an apparatus and method for realizing regulated, ultra-fast, opening and closing of a system aperture.

2. Background Art

There was for some time a need in the arts of both still photography and motion-picture making to provide shutter devices for the rapid opening and closing of a camera aperture for the purpose of exposing the film. Increased technological sophistication in the movie making art, in particular, has resulted in the improvisation of a number of optical shutter devices. Representative patents in this field include U.S. Pat. No. 3,735,687 to Park, U.S. Pat. No. 4,301,476 to Keller et al., U.S. Pat. No. 4,536,069 to Kunica, U.S. Pat. No. 4,571,629 to Horio et al., U.S. Pat. No. 4,581,515 to Egashira, U.S. Pat. No. 4,576,456 to Okino et al., U.S. Pat. No. 4,743,108 to Vogel et al., U.S. Pat. No. 5,539,488 to Erickson et al., and U.S. Pat. No. 5,850,277 to Dang et al.

More recently, a need has arisen for fast shutters for use in protecting diagnostic and sensing equipment in certain testing systems. For instance, in various research systems, it is required to measure the energy effects of a physical blast event. In certain types of research, a defined target may be bombarded with selected energy beams, or may be deliberately subjected to explosion. It is desirable in many cases to measure and evaluate the energy emanating from the target area. Measurement and evaluation often must be accomplished using sensitive and sometimes somewhat fragile yet expensive detection devices. In such instances, it is essential to protect the detection/measuring devices from physical blast debris originating from the target area as a result of the high-energy experiment. High-velocity particulate debris may damage or destroy sensitive detection or measurement instruments.

To protect delicate instrumentation in such experimental and testing systems, it is known to place some sort of barrier between the instrument and the target or blast zone, and to provide an aperture in the barrier to permit measurement by the detection device. A shutter is used to open the aperture at appropriate times to permit the passage of the energy to be measured, and then immediately closed prior to the passage of the ensuing wave of physical debris. The paramount challenge of such shuttered systems is the provision of sufficient shutter speed to allow the desired measurement to take place, and yet also prevent the passage of deleterious physical debris.

Currently, the protection of delicate detection devices in such experimental and testing systems often is accomplished by the simple expedient of widely separating the measurement instrumentation and the target zone. This solution is based upon the presumption that the energy to be measured (typically in the form of electromagnetic energy, or sub-atomic particles at near-light velocity) will rapidly outdistance, over relatively long distances, comparatively slow-moving microscopic or small macroscopic debris particles. Drawbacks of this solution include the larger size of the system, and the undesirable attenuation of the effect to be measured.

It has also been proposed to construct a fast shutter that is itself actuated by a chemical explosion. In such systems, a timed explosion drives a shutter (usually mechanical) closed at high speed. One example of such a detonator-activated shutter is described in U.S. Pat. No. 4,398,801 to McWilliams et al. While very fast-acting, such explosive-driven shutters pose obvious disadvantages.

A need remains, therefore, for a compact, energy-efficient, ultra-fast shutter suitable for use in protecting diagnostic and measuring instruments from deleterious blast debris in high-energy tests and experiments, and which allows the instruments to be situated proximate to the target area.

SUMMARY OF THE INVENTION (DISCLOSURE OF THE INVENTION)

The invention relates to a method and apparatus for performing ultra-fast aperture exposure, particularly for use in a system for protecting diagnostic equipment from blast damage, by rapidly interposing opaque shutters between the equipment and a blast origin. The inventive apparatus includes at least two disc-shaped shutters, each disc-like shutter having at least one opening penetrating therethrough. The shutters are coaxially rotated in opposite directions, and are independently driven, preferably by separate drives. A control circuit locks the phase of the shutters' openings rotation for each full rotation (one revolution of the shutter opening), such that at a synchronous rotational speed the shutters' openings are dynamically aligned at an angular position non-aligned with either or both the apparatus's exterior apertures, thereby providing complete aperture closure. Thus, when the apparatus is "closed" (i.e., condition of non-exposure) the shutters are rotated at a synchronized speed that provides for dynamic alignment of the shutter openings, but such alignment is on an axis that is not coaxial with the optical axis of the system (which runs through the exterior apertures of the apparatus), thus blocking the optical axis to prevent passage there-along of any debris, etc.

To perform an aperture exposure, the shutter openings are synchronously brought into dynamic alignment with the exterior apertures. The alignment is accomplished by unlocking the rotational phase of the shutter's openings and permitting their brief re-alignment in co-registration with the exterior apertures. To initiate exposure, the first shutter is accelerated from the synchronous angular velocity in a first direction, while the second shutter is decelerated in the opposite direction, thereby to align simultaneously the shutter openings with the exterior apertures. Then, after exposure, the shutters, still rotating, are returned to the aperture closure rotational phase of the openings and synchronous velocity by decelerating and accelerating the first and second shutters, respectively.

The exposure operation requires only a minor portion of the initial synchronous rotational kinetic energy of the shutters. Accordingly, the dynamic mechanical stress on the shutters is reduced, in comparison to other known rotary disc shutters, owing to the decreased acceleration. Both shutters' rotational speeds and openings phase lock are set by a controller, preferably a digital processor, which regulates the drive speed of the each shutter. This regulation preferably is realized using an optical encoder's signal as a feedback.

Thus, an object of the invention is to provide an ultra-fast abbreviated exposure method using a single or multi-aperture shutter apparatus.

A further object of the invention is to provide a shutter apparatus which prevents undesirable products from passing through to an associative system.

A further object of the invention is to provide an aperture exposure method for increasing the speed and reliability of shutter operation.

Another object of the invention is to provide high-energy electromagnetic beam (laser, microwave, and the like) modulation using a controllable aperture.

Another object of the invention is for use in high-speed video or photo cameras and the like.

An advantage of the invention is the minimization of dynamic loading which, in conventional rotary shutter mechanisms, results from the application of high impulse forces to the shutters to cause their rapid acceleration. Because each shutter in the present invention is gradually "preset" to an operational angular speed, and the required acceleration to perform exposure action is dramatically reduced. There are attendant benefits in energy efficiency and apparatus stability and durability. Generally, in conventional rotary shutter devices, the shutters must be accelerated from zero velocity to operational speed during the exposure action—which, when the exposure timing desirably is extremely brief, is an intensive operation.

In contrast in the present invention, to perform an exposure, the shutters are accelerated and decelerated through a full or nearly full (or multiples of full) revolution by adding or subtracting only a small portion of rotational kinetic energy of the discs that are rotated at the synchronous angular speed.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 is a schematic illustration (with partial side sectional view) of an ultra-fast shutter system according to a preferred embodiment of the invention, for protecting diagnostic equipment from blast debris or overexposure to energy impulses;

FIGS. 13A-C, 14A-C, 15A-C depict the positional relationships between the rotary shutters of the embodiment shown in FIG. 9 as they move through the closure cycle.

Figure 2A:
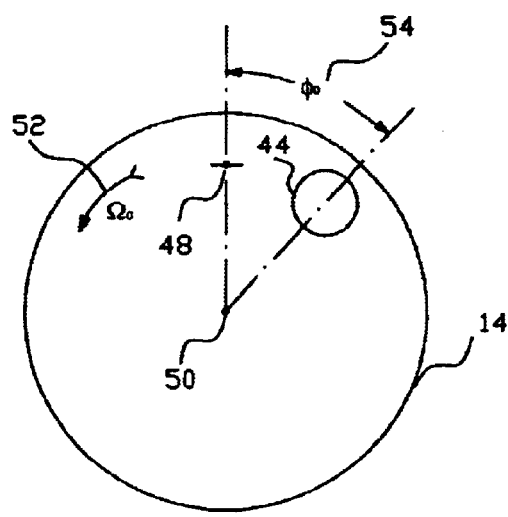
FIGS. 2A-2C and 3A-C show the positional relationships between the rotary shutters shown in the embodiment of FIG. 1 as they move through the opening or "exposure" cycle.

DESCRIPTION OF THE PREFERRED EMBODIMENTS (BEST MODES FOR CARRYING OUT THE INVENTION)

The invention relates to a method and apparatus to perform a fast aperture exposure, particularly for use in an apparatus for protecting diagnostic equipment from blast damage by rapidly interposing rotary shutters between the equipment and blast area or origin. The apparatus of the invention is an ultra-fast, electrically activated, rotary shutter mechanism. The apparatus requires only a minor change in the synchronous rotational kinetic energy of the shutter discs to perform an exposure action. Accordingly and advantageously, the dynamic mechanical stress on the shutters is reduced due to significantly decreased shutter acceleration. While the invention has application in many fields, it is particularly suitable in the testing of explosives or other pulsed sources of electromagnetic radiations.

FIG. 1 is a schematic, including a partial side sectional view, of a preferred embodiment of an apparatus according to the invention, showing the shutter mechanism and control circuits. In the preferred embodiment, two shutters are used to protect sensitive equipment 4 from the debris 6 moving from a blast source or source of electromagnetic pulse 8.

An optical axis 48 is defined by a line directed from the source of electromagnetic pulse 8 to the sensitive equipment 4. The blast source 8 may be an explosion or other physical phenomenon to be evaluated or tested, such as some source of electromagnetic radiation. The sensitive equipment 4 may be any of a number of known or yet to be developed instruments or detectors for performing diagnostics or monitoring of physical phenomena. The present invention permits the sensitive equipment to perform a desired amount of detection or measurement of energy emitted from the blast zone 8, while also rapidly shutting the optical axis path 48 from zone 8 to equipment 4 before blast debris 6 or overexposure from blast zone damages the sensitive equipment.

The shutter mechanism comprises two shutter assemblies 10 and 12. The first shutter assembly 10 includes a first shutter 14, preferably disc-shaped as seen in FIG. 2A, rotatably mounted coaxially on shaft 30 via suitable bearings on the casing. First shutter 14 has an opening 44 defined there-through at a position radially offset from the shutter's center of rotation 50, as depicted in FIG. 2A. Assembly 10 also includes a built-in stator 16, encoder disc 17, and optical encoder 18. The encoder disc 17 is mounted, for example, on a sleeve of shutter 14, and its angular speed and position are monitored and determined by the by the optical encoder 18 of known construction. The build-in stator 16, possibly annular in configuration, is located round the periphery of the shutter 14 and mounted on the housing of the shutter disc assembly 10.

Figure 3A:
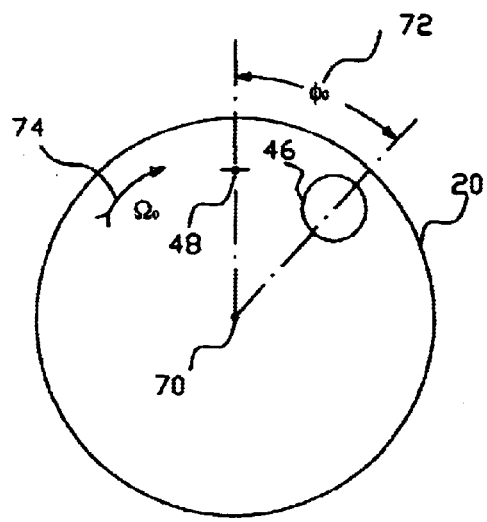

The second shutter assembly 12 likewise consists of a second shutter 20 (also preferably disc-shaped) rotatably mounted on the shaft 30, as well as stator 22, encoder disk 24, and optical encoder 26. Second shutter 20 has an opening 46 defined there-through at a position radially offset from the shutter's center of rotation 70 by an offset distance equal to the offset distance of the opening 44 on shutter 14, as depicted in FIG. 3A. Combined reference to FIGS. 2A and 3A shows that the two shutters 14 and 20 are substantial duplicates, with openings 44, 46 of about equal diameters. The second encoder disc 24 is mounted on the sleeve of the second shutter 20, and its angular speed and position are monitored and determined by the optical encoder 26. Again, the built-in stator 22 is located round the periphery of the shutter 20 and mounted on the housing of the shutter disc assembly 12.

In a preferred embodiment, the rotor for the electrical motor of each shutter assembly is the shutter disc itself; each shutter 14, 20 is rotated by the torque that is produced as result of magnetic field and current interactions on the periphery of the shutter disc. In the present invention, the built-in motor incorporating the shutters 14 and 20 as motor rotors and stators 16 and 22 provides effective and compact rotary system. Alternatively, separate (off-the-shelf) motors operatively connected to the shutters may be used for driving the shutters 14 and 20 in each assembly 10, 12. It is apparent to one skilled in the art that the manner of rotating the shutters is not critical, conventional motor-driven driveshafts are acceptable. It is preferable to employ the shutter as the rotor, to provide a compact system.

The first shutter 14 and second shutter 20 are coaxially rotated in opposite directions and independently driven by stators 16 and 22 through the separate amplifiers, 28 and 32 respectively, that are controlled by controller/processor 34. Input control 36 allows manual or other electronic input for controller 34 to set aperture exposure time, synchronization mode, and type of operation. Synchronization of the radiation source time pulsing and the phase of the shutter's openings rotation are accomplished through the exposure request line 38 and ready-for-operation line 39, which are coupled with the controller/processor 34. Controller/processor 34 is programmed with digital software routines, within the skill of a programmer of ordinary skill in the art, for providing automated electronic control of the apparatus of the invention.

In operation of the embodiment of FIG. 1 the controller/processor 34 receives and processes signals, respecting angular position and speed data for the shutters 14, 20, from encoders 18 and 26. Processing position and speed data, the controller/processor 34 performs speed and phase lock control of the openings 44, 46 independently for each shutter 14 and 20. In the "arm" and "unexposed" state, when the shutter mechanism is ready to perform an exposure action, the openings 44, 46 of both shutters are locked in phase of $\phi_0$ (see FIG. 2A). At such synchronous rotational speed, the shutters' openings 44, 46 are dynamically aligned at a certain angular position unregistered (i.e., not coaxial) with the exterior aperture 42, providing the effective closure of aperture 42 during the rotation of shutters 14, 20 as shown on FIGS. 2A and 3A.

The exposure action of the shutter mechanism is activated by an electrical signal through the exposure request line 38 from the explosive control circuits (not shown on the drawings) to controller/processor 34. This signal must be generated in advance of the actual exposure time in order to give enough time for the shutter mechanism and control circuits to reach the angular position of phase lock openings and to perform simultaneous alignment of both openings 44, 46 of the shutters 14 and 20 with the device's exterior input 40 and output 42 apertures. After exposure, the controller/processor 34 performs a reset action to return the rotational phase of openings and speed of both shutters to the initial values (the "arm" state of the shutter mechanism) or to decelerate both shutter discs down to zero angular speed to cease usage of the apparatus.

FIGS. 2A-C and 3A-C depict the phases of the openings and speeds of both shutters 14, 20 during the exposure function, after the controller 34 receives the exposure request signal. FIGS. 4A-C and 5A-C show the angular locations of the openings and angular speed of both shutters 14, 20 after exposure, at pertinent times during the reset action. In FIG. 2A, a first shutter disc 14 is illustrated having a first opening 44, the center of shutter rotation 50, and the optical axis 48. The shutter 14 is rotated in the counter-clockwise direction 52 at a synchronous speed of $\Omega_0$. FIG. 3A, illustrates the second shutter 20 having a second opening 46, the center of disc rotation 70, and the optical axis 48. The second shutter 20 is rotated in the clockwise direction 74 at the synchronous speed of $\Omega_0$. The centers of rotation 50 and 70 of both shutters 14 and 20 preferably are aligned with the axis of shaft 30, while the optical axis 48 is parallel thereto.

FIGS. 2A and 3A show the dynamic shutters' angular positions (for each full revolution of each opening 44 or 46 about centers 50, 70), with the shutters rotating at an absolute synchronous speed of $\Omega_0$ whereby their respective openings 44 and 46 are dynamically aligned at the angle of $\phi_0$ 54 (phase lock of openings). The angle $\phi_0$ is measured in the plane perpendicular to the shutters' centers of rotation 50 or 70, between the line connecting the center of rotation and optical axis and the line connecting center of rotation and center of opening 44 or 46. At this angle, the openings 44 and 46 are not aligned with the exterior apertures 40 and 42, providing a complete occlusion or closure of the exterior apertures 40, 42 during rotation of the shutters.

The controller 34 locks the phases of the shutter's openings' rotations by processing the feedback signals from the encoders 18 and 26. Controller 34 thus maintains a synchronous speed of $\Omega_0$ of the shutters through the amplifiers 28 and 26 by regulating the excitation currents in the driving stators 16 and 22, respectively. This dynamic state of shutter rotation represents the inventive apparatus's condition when it is ready (armed state) to perform an exposure operation. Exposure operation can be triggered by an external source or manually by an operator.

There are at least two available modes to trigger the shutter mechanism exposure: asynchronous and synchronous. In the asynchronous mode, the controller 34 awaits an exposure request signal from an external source or an operator's input to perform an exposure action. Because this event may happen at any time, the positions of the shutter openings 44 and 46 may be out of the phase $\phi_0$. Therefore, the controller 34 delays initiating the aperture exposure procedure until both openings of the shutters 14, 20 co-register at the angle $\phi_0$, then it generates a ready-for-operation signal on line 39 to notify the external control circuits about following aperture exposure procedure. At the same time, the controller 34 sets the digital data lines 41 to an estimated exposure preceding time interval for a precise time pulsing synchronization. The external control circuits then adjust the actual time event according to the given time interval or simply ignore the ready-for-operation signal from the controller 34 to abort the requested aperture exposure event from the shutter apparatus. The maximum delay time of the exposure event for this mode is equal to the time interval required for a shutter 14 or 20 to complete approximately two revolutions at the angular speed of $\Omega_0$. For instance, at the synchronous speed of 200 revolutions per second, the maximum delay time is equal to 9.6 milliseconds.

Figure 8:
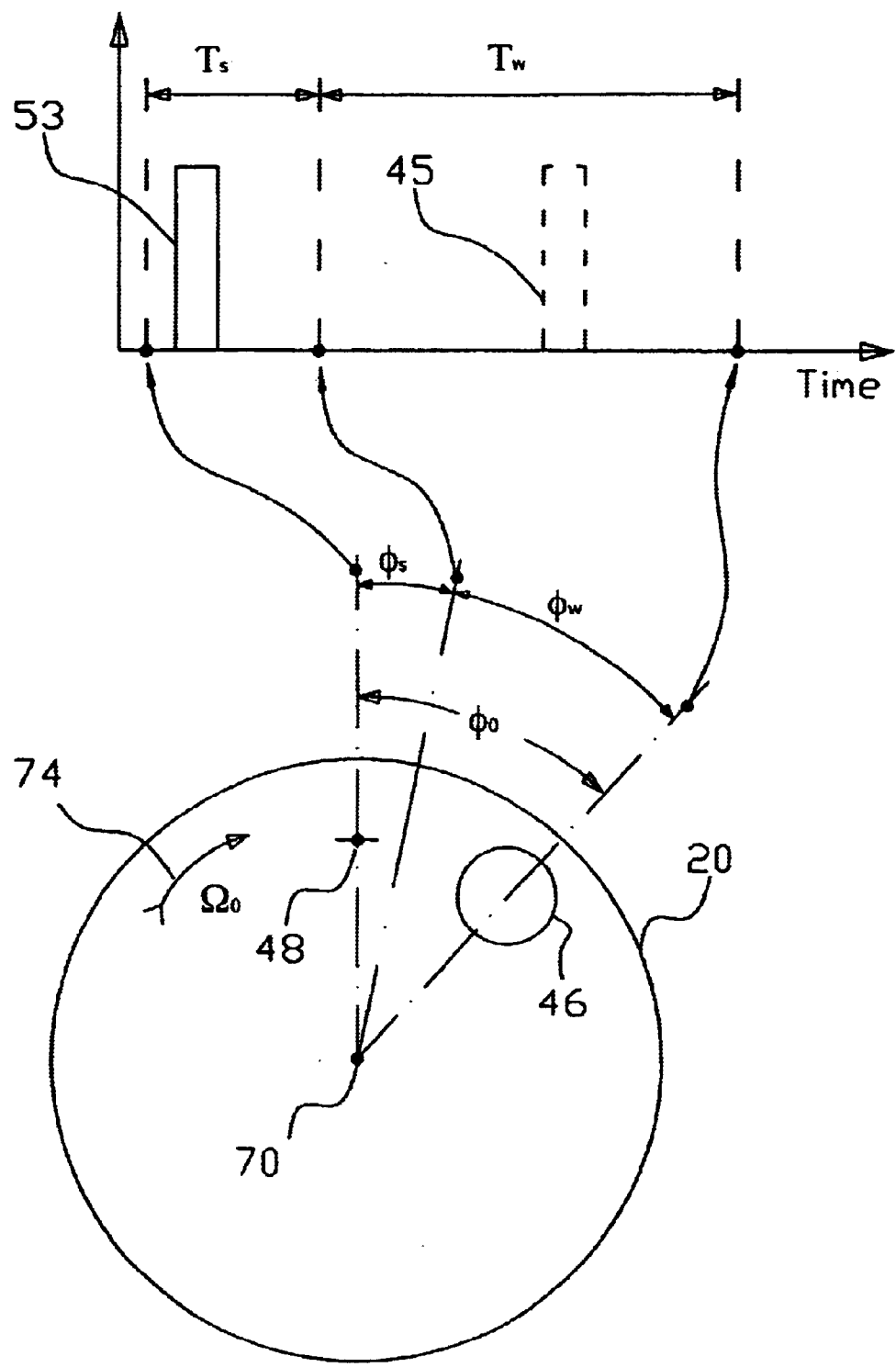
FIG. 8 shows correspondence of a relative spatial phase of the disk's opening with the synchronization signals.

In the synchronous operation mode alternative, at each shutter rotation the controller 34 generates a short pulse (time mark) 53 that corresponds to the second shutter's 20 certain angular position that is located inside angular segment of $0<\phi<\phi_s$ as shown in FIG. 8. In such a scenario, the controller 34 awaits a confirmation signal 45 from an external source, ordinarily the blast or pulse source 8, during a time window $T_w$. The time window $T_w$ for detecting a confirmation signal is calculated from the expression of $T_w=\phi_0/\Omega_0$. The external source must respond during the time window if the aperture exposure action is requested. On a confirmation signal event, the controller 34 sets the digital data lines 41 to an estimated exposure time according to the current disks angular speed $\Omega_0$ for precise synchronization and performs the exposure procedure. The confirmation signal shares the same control line 38 with the asynchronous exposure request signal. If the confirmation signal is not received during the time window $T_w$, the controller 34 reverts into a standby state for this operation until the next time mark is generated. The synchronous mode of operation of the invention provides faster response time than the asynchronous mode, since it requires performing only exposure operation without waiting for a certain disk's rotational phase.

The exposure procedure according to the invention begins when two conditions are met: (1) the controller 34 receives an exposure request signal (asynchronous mode) or a confirmation signal (synchronous mode), and (2) the openings 44 and 46 are aligned at the same time at the angle of $\phi_0$. As discussed above, the invention is advantageous in that both shutters 14, 20 are rotated at the same operational angular speed before an exposure action, and that the aperture exposure is performed by adding and removing, from first and second shutters respectively, only a small portion of the initial rotational kinetic energy of the shutters (which are accelerated or decelerated through a single full (or even several full) revolution).

Figure 6:
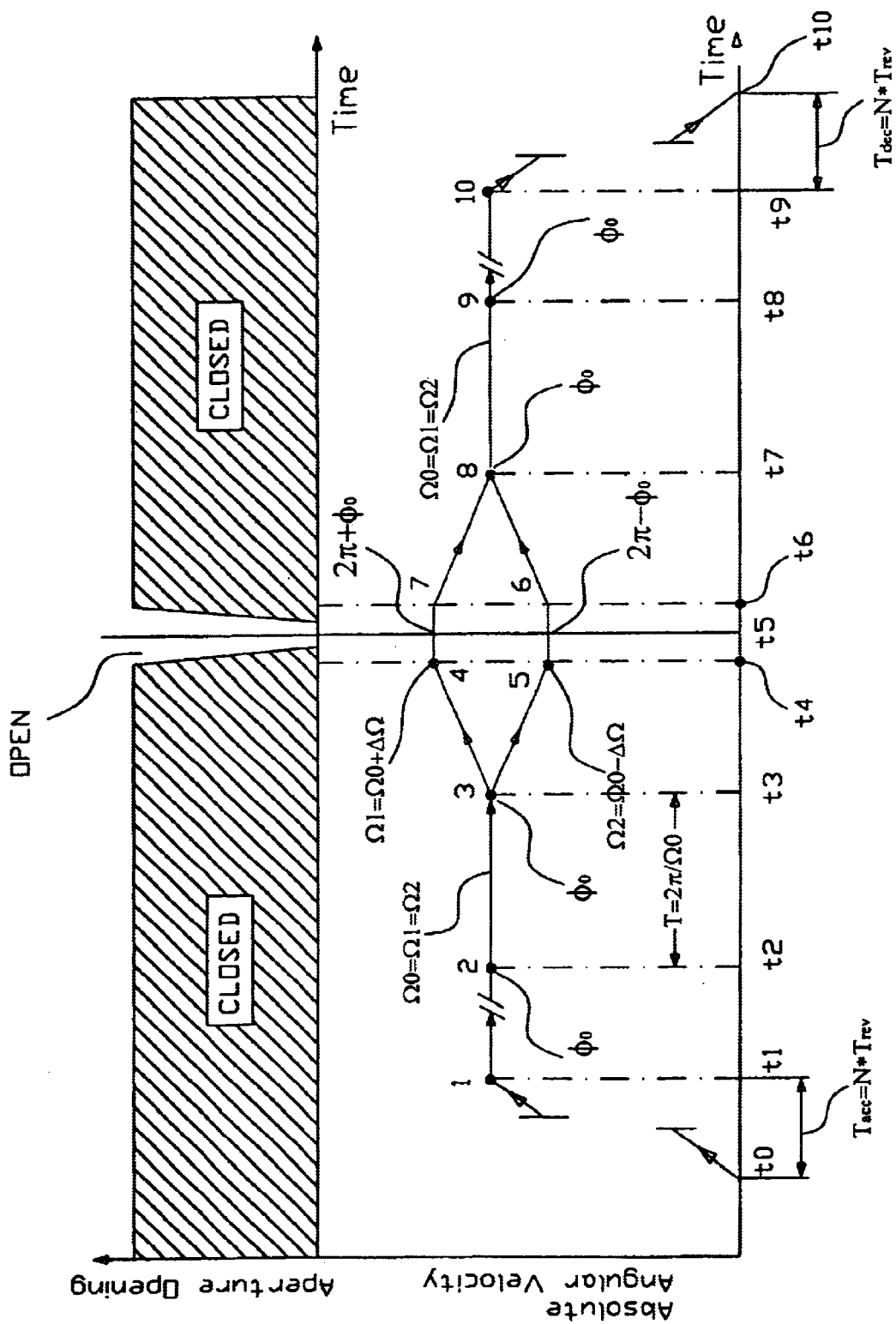
FIG. 6 is a timing chart of the shutters' absolute angular velocity, and corresponding aperture open/closed condition of the embodiment shown in FIG. 1 during one complete operation cycle.

The invention permits the regulated, abbreviated, exposure of the sensitive instrument 4 to effects emitted from the blast or pulse origin 8. The exposure method according to the invention comprises the following steps. Referring to FIG. 6, it is seen that the apparatus is operated by first gradually bringing the shutters from a full stop condition (at $t_0$) to the synchronized angular speed $\Omega_0$, for the "armed" condition (at $t_1$). The angular speed $\Omega_0$ is equal in absolute value for both disks but these are rotated in opposite directions. In a first actuation step, the angular speed $\Omega_0$ of the first and second shutters are computed (at some time $t_2$ for example) using the two most recent readings of absolute angular positions of both meter discs 17 and 24 by the optical encoders 18 and 26 respectively.

Figure 2B:
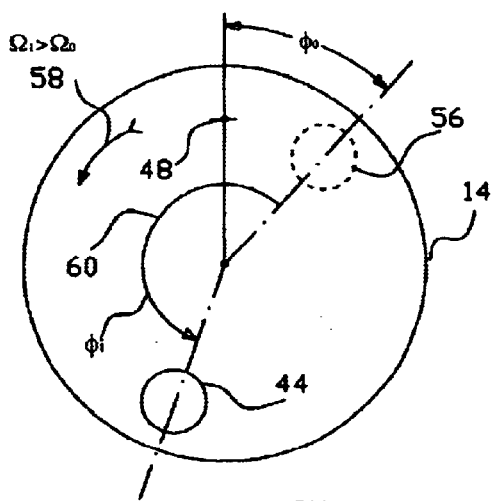
Figure 3B:
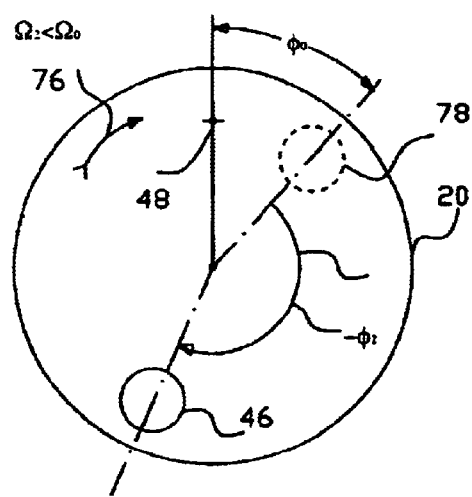

Referring to time interval $t_3$ to $t_4$ on FIG. 6 for a second exposing step, the angular speed of the first shutter 14 is gradually increased to the value of $\Omega_1=\Omega_0+\Delta\Omega$, while the angular speed of the second shutter 20 is gradually decreased to $\Omega_2=\Omega_0-\Delta\Omega$ during the exposure procedure. The magnitude of $\Delta\Omega$ is calculated by the controller 34, based on the acceleration required to synchronously bring both shutter openings 44, 46 into registration with the first 40 and second 42 exterior apertures, so that all the openings and apertures are aligned along the optical axis 48 ($t_5$ on FIG. 6). The transient opening 44, 46 locations for the first and second shutters are illustrated in FIGS. 2B and 3B respectively. As the figures illustrate, the first shutter 14 has the angular speed of $\Omega_1>\Omega_0$ (58), and turns through the angle of $\phi_1$ from the locked phase position. The phase locked position 56 is depicted by phantom lines defining the dashed circle seen in the FIG. 2B. At the same time, the second shutter 20 is decelerated to the angular speed of $\Omega_2<\Omega_0$ (76), as it turns through the angle of $-\phi_2$ from the locked phase opening position. The phase locked opening position 78 is illustrated by the dashed circle shown in the FIG. 3B.

Figure 2C:
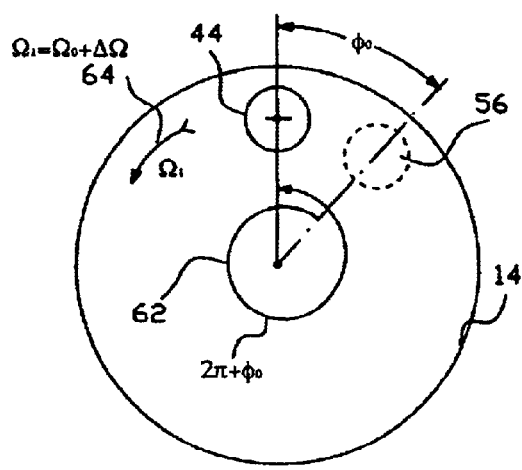
Figure 3C:
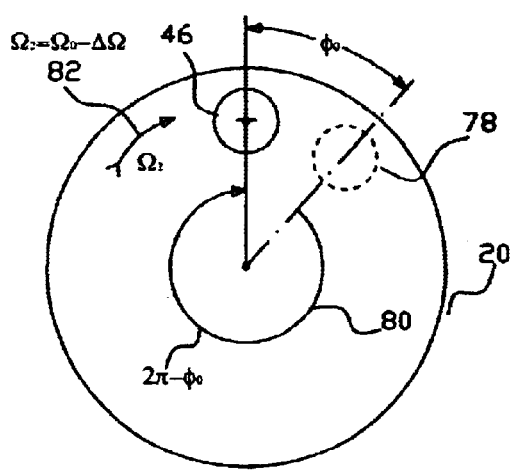

Thus, as can be seen from the FIGS. 2C and 3C, the first shutter 14 phase shifts to a first shutter exposure angle $\phi_1$, wherein $\phi_1=2\pi+\phi_o$. Similarly, the second shutter 20 phase shifts to a second shutter exposure angle $\phi_2$, where $\phi_2=2\pi-\phi_o$. The phase shifts to adjust the angular positions of the openings 44, 46 to their exposure positions preferably occur during approximately one revolution of the shutters, to register with the exterior apertures 40 and 42.

Figure 4A:
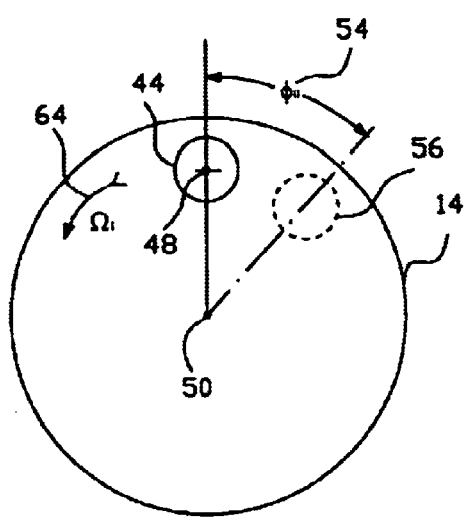
FIGS. 4A-C and 5A-C show the positional relationship between the rotary shutters of the embodiment of FIG. 1 as they move through the closure cycle after exposure.
Figure 5A:
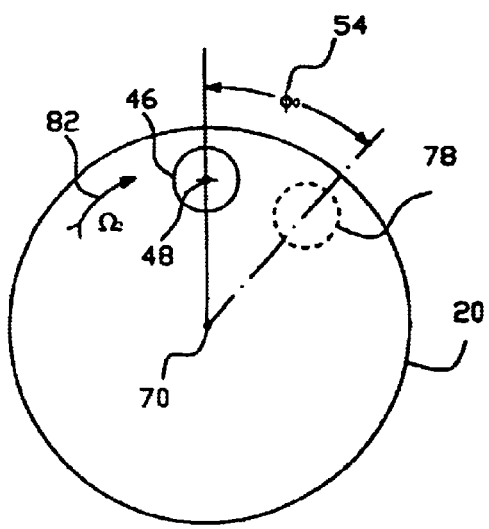

Then ($t_4$ to $t_6$ on FIG. 6), as a result of the shifting of the shutter openings 44, 46, the exterior apertures 40 and 42 and shutter openings are aligned coaxially along the optical axis 48, thus providing a complete conduit or tunnel to permit the passage there-through of radiation to the equipment 4. This third, or alignment, step ends a half cycle of the shutter apparatus operation. To complete the cycle, the shutters 14, 20 must be returned to the initial "armed" rotational condition. That state or condition is characterized by two parameters: the synchronous angular speed $\Omega_0$ and the phase lock of disc's rotation angle $\phi_0$. The exposure operation changes the angular speed and phase of the openings' rotation of the shutters 14 and 20. The shutters' angular speeds after the exposure become $\Omega_1=\Omega_0+\Delta\Omega$ and $\Omega_2=\Omega_0-\Delta\Omega$ for the first and second shutters respectively. Since $|\Omega_1|\neq|\Omega_2|$, the rotational speed of the shutters 14 and 20 is no longer synchronous, and therefore the openings' alignment angle will be different after each full revolution of the shutters. FIGS. 4A and 5A show the instantaneous shutters' angular positions when their openings 44 and 46 are aligned with the optical axis 48 at the angle of $\phi=0$ (54).

The return procedure (reset to the initial state) steps are performed in reverse order to the exposure procedure steps. In sum, the reset method comprises the following steps. In a fourth step the angular speeds of $\Omega_1$ and $\Omega_2$ (at $t_5$ on FIG. 6) of the first and second shutters 14, 20 are computed using two recent readings of the absolute angular position of both discs 17 and 24 from the optical encoders 18 and 26, respectively.

Figure 4B:
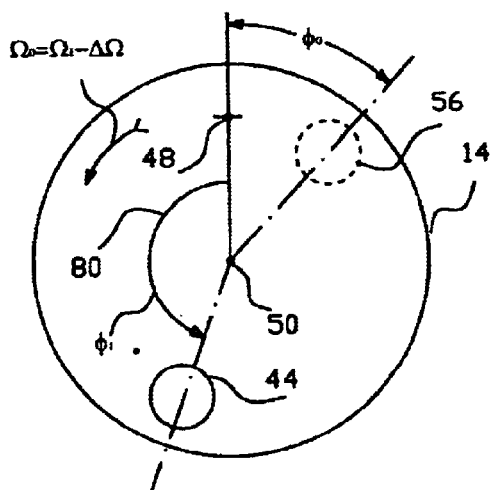
Figure 5B:
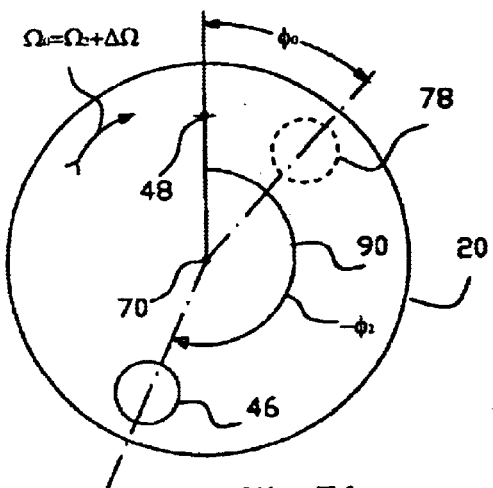
Figure 4C:
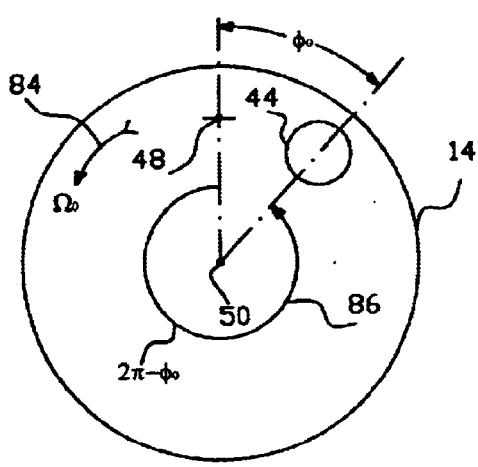
Figure 5C:
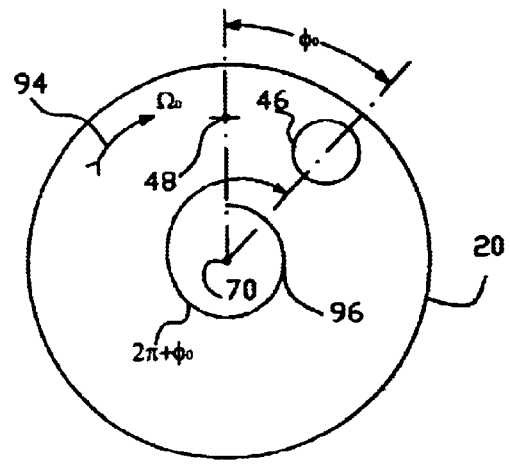

In a fifth step, the angular speed $\Omega_1$ of the first shutter 14 is gradually decreased to the angular speed of $\Omega_0$, while the angular speed $\Omega_2$ of the second shutter 20 is gradually increased to the value of $\Omega_0$. The reset accelerations occur from $t_6$ to $t_7$ on FIG. 6. The magnitude of $\Delta\Omega$ is calculated by the controller/processor 34 based on the requirement to simultaneously turn both first 44 and second 46 openings to the initial angular position $\phi_0$, at the initial synchronous speed of $\Omega_0$ during approximately one revolution, as seen in FIGS. 4C and 5C ($t_7$ in FIG. 6). As can be seen from FIG. 4C, the first shutter 14 must turn on the angle $\psi_1$ where $\psi_1=2\pi-\phi_o$, to return its opening to the phase lock position. During this turn, the velocity of the first shutter will be decreased in the value of $\Delta\Omega$ to reach the initial synchronous speed of $\Omega_0$ at the end of reset operation. The second shutter 20 must turn on angle $\psi_2$ where $\psi_2=2\pi+\phi_o$, to reach the phase lock position of its opening (FIG. 5C). The angular speed of the second shutter 20 is gradually increased by $\Delta\Omega$ during the reset procedure, thereby to reach the initial synchronous speed of $\Omega_0$. The transient locations for the first and second openings 44 and 46 in the respective shutters are depicted in FIGS. 4B and 5B respectively.

Figure 7:
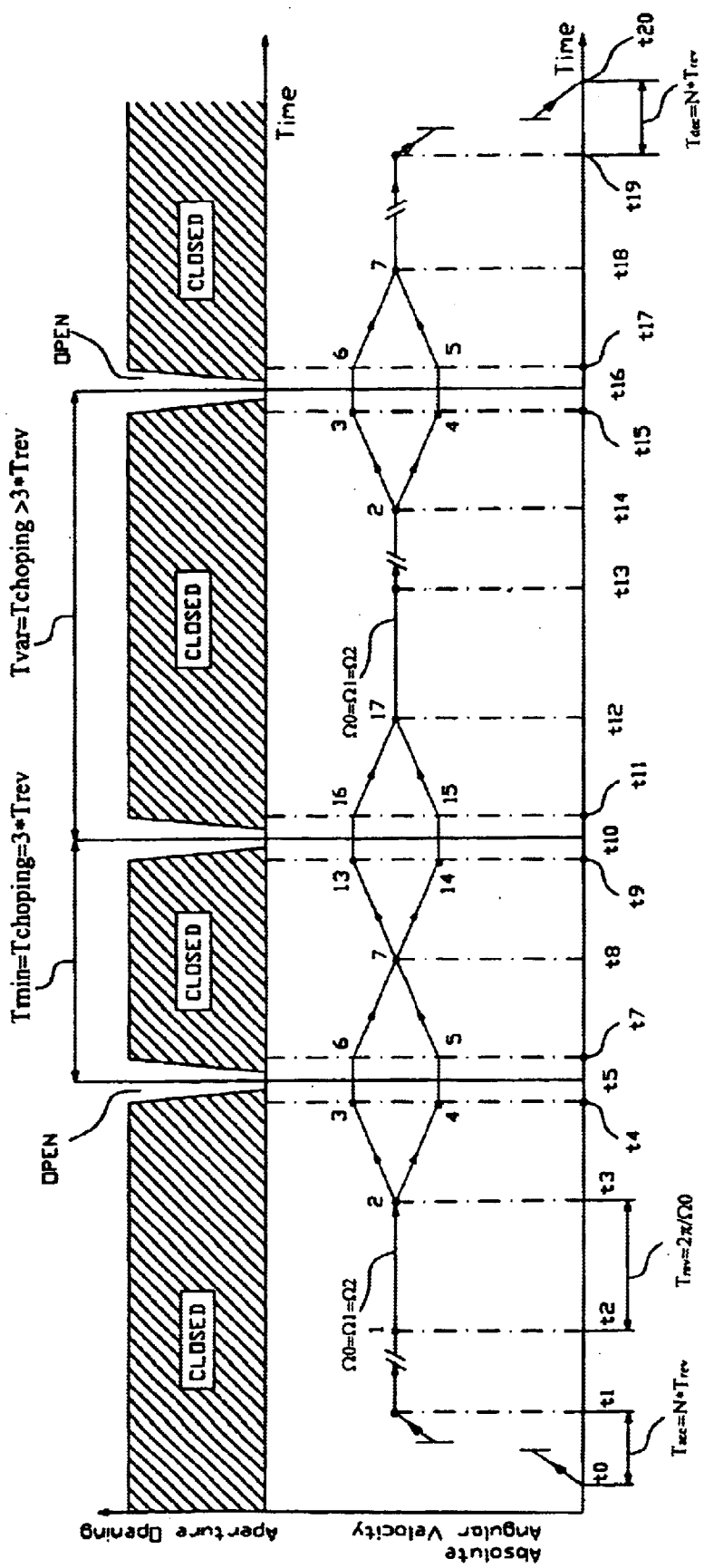
FIG. 7 is a timing chart of the shutters' absolute angular velocity and corresponding aperture open/closed condition of the embodiment shown in FIG. 1 over three repeated operational cycles, showing a minimum time interval between consequent openings and arbitrary time interval respectively.

As a result, the openings of both discs 14 and 20 are aligned at the angle of $\phi_0$ (time $t_7$, on FIG. 6) and rotate with the synchronous speed of $\Omega_0$ ($t_8$ to $t_9$ on FIG. 6), as shown in FIGS. 4C and 5C. This step completes the shutter mechanism aperture exposure-reset operation cycle and returns the apparatus to its initial "armed" and closed state. As indicated by FIG. 7, the process of the exterior aperture exposure can be repeated though two or more cycles, by repeating the foregoing steps. At the completion of testing, the apparatus is shut off, and the shutters are gradually returned to rest condition of zero angular speed ($t_{10}$ in FIG. 6, $t_{20}$ in FIG. 7).

An alternative embodiment of the invention is very similar in many respects to the described two-shutters embodiment, except that in the alternative a third rotating shutter is added to provide a regulated exposure through multiple non-coaxial apertures. The third shutter plays a role of a rotary mask, which provides for controllable exposure of multiple apertures during one or several full revolutions of another two synchronously rotated shutters during an aperture exposure procedure. It significantly decreases required acceleration of the shutters, and, therefore mechanical stress. In this alternative embodiment the openings in each shutter must have a rotational symmetry around the center of shutter rotation. The angular speed of the third shutter is only a certain fraction of the initial synchronous angular speed of the other two shutters. Specifically, the angular speed of the third shutter is inversely proportional to the rotational symmetry order of the shutters. For instance, if a rotational symmetry order of the shutters is equal to two and the synchronous angular speed is $\Omega_0$, then the third introduced shutter's angular speed $\Omega_{mask}$ is determined to be $\Omega_{mask}=\Omega_0/2$. This means that synchronously rotated shutters will turn one full revolution during an exposure or reset procedure while the third shutter turns only one-half revolution. The alternative embodiment facilitates the use of multiple, separate, and possibly entirely different, items of measuring equipment.

As an example, the description of the alternative embodiment is given below on a shutter apparatus that employs three shutters, i.e., with a rotational symmetry order of three. This means that the first and second synchronously rotated shutters 100, 130 will turn one full rotation during an exposure or reset procedure, while the third shutter 120 turns only one-third rotation. However, the invention is not limited to this particular symmetry order. Higher orders of rotational symmetry can be employed, with the number of openings in each shutter numbered correspondingly. Thus, the order of rotational symmetry may be given as x, where x equals the number of symmetrically arrayed openings in each shutter, and whereby the angular speed of rotation of the third or "masking" shutter is given as $\Omega_0/x$.

Figure 9:
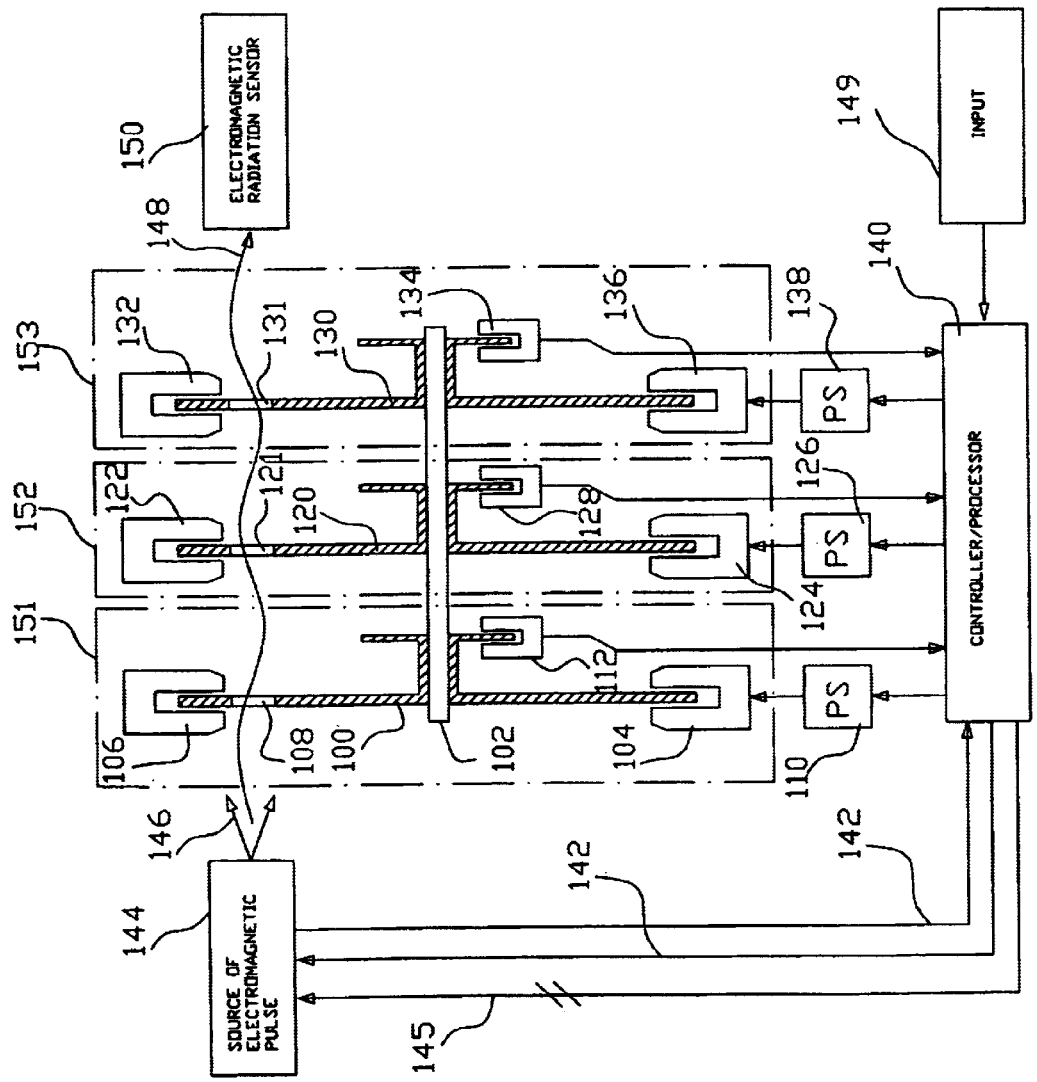
FIG. 9 is a schematic illustration (partial side sectional view) of an alternative embodiment of the invention, showing an ultra-fast shutter system having three shutters for use in systems featuring more then one aperture.
Figure 12A:
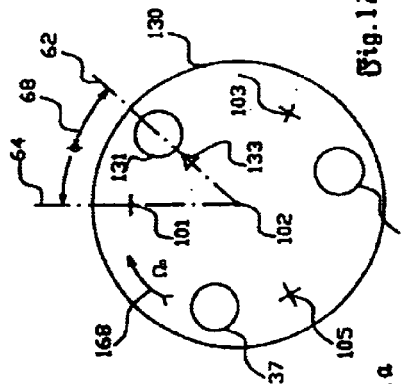
FIGS. 10A-C, 11A-C, and 12A-C depict the positional relationships between the rotary shutters of the embodiment shown in FIG. 9 as they move through the opening cycle.
Figure 11A:
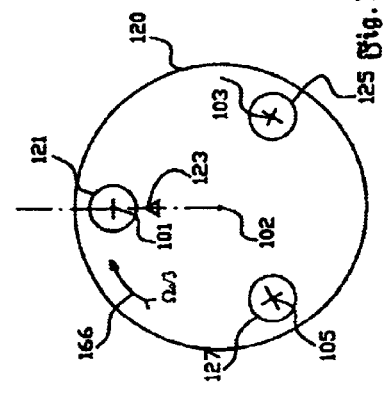
Figure 10A:
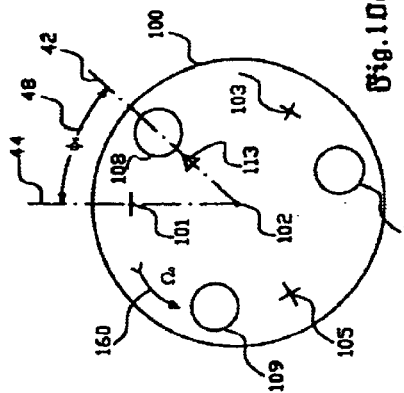

FIG. 9 shows the alternative embodiment of the invention at the exposure state. It also includes a partial side sectional view. This alternative embodiment includes three identical shutter mechanisms that are used to protect sensitive equipment 150 from the debris 146 moving from a blast source or source of electromagnetic pulse 144. In the alternative embodiment, each shutter 100, 120, 130 defines three openings that provide a through-channel to the corresponding sensor (only one sensor and channel are shown on FIG. 9). FIGS. 10A, 11A, and 12A show that the three shutters 100, 120, and 130 are controllably rotated to provide exposure through three exterior apertures on three separate but parallel optical axes: first optical axis 101, second optical axis 103, and third optical axis 105. An understanding of the alternative embodiment is had by reference to the foregoing description of the preferred two-shutter embodiment of the invention coupled with the following added disclosure.

Figure 11B:
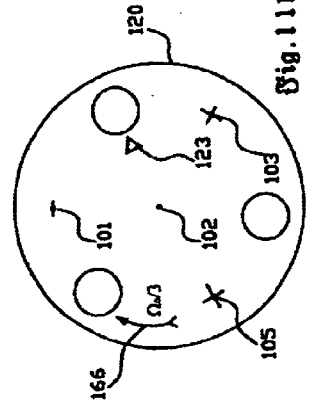
Figure 11C:
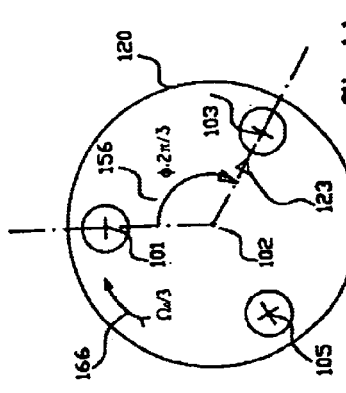

The alternative shutter mechanism comprises three shutter assemblies 151, 152, and 153. The first shutter assembly includes a first shutter 100, preferably disc-shaped as seen in FIG. 10A, rotatably mounted coaxially on shaft 102 via suitable bearings on the casing. First shutter 100 has three openings 108, 109, and 111 defined there-through at positions radially offset from the shutter's center of rotation 102, as depicted in FIG. 10A. Openings 108, 109, and 111 are uniformly arrayed around the center of rotation, i.e., are disposed at approximately 120° angular intervals. The second shutter assembly likewise consists of a second shutter 130 (also preferably disc-shaped; FIG. 12A) rotatably mounted on the shaft 102. Second shutter 130 has openings 131, 135, and 137 defined there-through at positions radially offset from the shutter's center of rotation 102 by distances equal to the offset distances of the openings 108, 109, and 111 on shutter 100, as depicted in FIGS. 11A-C. Similarly, the third shutter assembly consists of a third shutter 120 rotatably mounted on the shaft 102. Third shutter 120 has openings 121, 125, and 127 defined there-through at positions radially offset from the shutter's center of rotation 102 by distances equal to the offset distances of the openings 108, 109, and 111 on shutter 100, as depicted in FIGS. 13A-C. Combined reference to FIGS. 10A, 11A and 12A shows that the shutters 100, 120 and 130 are substantial duplicates of one another, with openings having substantially equal diameters.

Fiducial triangular marks 113, 123, and 133 are added to the FIGS. 10, 11, and 12 respectively to aid the reader in visualizing the various angular shutter positions during exposure procedure.

The alternative embodiment also features built-in stators 104, 106, 122, 124, 132, 136, encoder discs and associated optical encoders 112, 128, and 134, which serve essentially the same functions in substantially the same ways as the counterpart elements in the two-shutter embodiment, except that the elements occur in triplicates corresponding to the three shutter assemblies. The angular speed and positions of the shutters 100, 120, and 130 are monitored and determined by the by the readings of the optical encoders 112, 128, 134 via the rotation of the associated encoder discs.

The first shutter 100 and second shutter 130 are coaxially rotated in opposite directions, and independently driven by the separate stators 104, 106 and 132, 136 through the amplifiers, 110 and 138 respectively, that are controlled by controller/processor 140. Third shutter 120 is rotated coaxially with the other two shutters but in the opposite direction (generally, the direction of the second shutter rotation is not important) of the first shutter 100 and the same direction as the second shutter 130, as suggested by the direction arrows seen in FIGS. 10A-C, 11A-C, and 12A-C. (The direction of rotation for the masking shutter 120 is not critical; it simply must rotate in the same direction of one of the other two shutters, which other two shutters 100 and 130 must rotate in opposite directions.) Amplifier 126 regulates stators 122, 124 to drive the third shutter 120 at controllable angular speeds, which constitute only one-third of the synchronous absolute angular speed of the first and second shutters. Input control 149 allows manual or other electronic input for controller 140 to set aperture exposure speed, synchronization and type of operation.

As with the preferred embodiment, synchronization of the radiation source time pulsing with the phase of the shutter's openings rotation are accomplished through the exposure request line 142, which is connected to the controller/processor 140. Controller/processor 140 is programmed with digital software routines, within the skill of a programmer of ordinary skill in the art, for providing automated electronic control of the apparatus of the invention.

In operation of the embodiment of FIG. 9 the controller/processor 140 receives and processes signals, respecting angular position and speed data for the shutters, from encoders 112, 128 and 134. Processing position and speed data, the controller/processor 140 performs angular speed and phase lock of the shutter's openings control independently for each shutter 100, 120, and 130. In the "arm" and "unexposed" state, when the shutter mechanism is ready to perform an exposure action the openings of first and third shutters are locked in phase of $\phi_0$ (see FIGS. 10A and 12A), while the openings of the second shutter are locked in phases of $\phi=0, \pi/3$, and $3\pi/2$ as shown on FIG. 11A. At the "armed" state the shutters' respective openings 108, 109, 111, 131, 135, 137 are dynamically unaligned at angular positions unregistered (i.e., not coaxial) with the three exterior apertures of the device (not shown), providing the effective closure of all the apertures during the rotation of the shutters. This fully closed "armed" phase condition is depicted by combined reference to FIGS. 10A, 11A, and 12A. As also indicated in FIGS. 10A, 11A, and 12A, in the apparatus "armed" state the synchronous speed is set to $\Omega_0$ for the first and second shutters 100 and 130 (but in opposite directions) and $\Omega_0/3$ for the third shutter 120 in the same rotational direction as shutter two 130. The angular speed of the third shutter 120 is not varied during exposure and reset operations; rather its value remains constant at $\Omega_0/3$ for period of active use of apparatus.

The exposure action of the three-shutter embodiment is activated by an exposure request signal through line 142 from the explosive control circuits (not shown on the drawings) to controller/processor 140. The exposure request-signal must be generated in advance of the actual exposure time in order to give enough time for the shutter mechanism to reach the shutter openings' phase lock (see FIGS. 10A, 11A, and 12A) and to perform simultaneous alignment of all openings' 108, 109, 111, 131, 135, 137 of the shutters 100, 130 with the device's input and/or output apertures (not shown). After exposure, the controller/processor 140 performs a reset action to return the openings' rotational phase and its angular speeds of the first and third shutters to the pre-triggered values (the "arm" state of the shutter mechanism) (or to decelerate all shutter discs down to zero angular speed to shut down the apparatus entirely).

FIGS. 10A-C, 11A-C and 12A-C depict the phases and speeds of all three shutters 100, 120, 130 during the exposure function, after the controller 140 receives the exposure request signal. FIGS. 13A-C, 14A-C, and 15A-C show the phases and speed of all three shutters after exposure, at various times during the reset action. In FIG. 10A, the first shutter 100 has three openings 108, 109, 111, dynamically located at angular positions offset from the optical axes 101, 103 and 105. The shutter 100 is rotated in the counterclockwise direction 160 at a synchronous speed of $\Omega_0$. In FIG. 12A, the second shutter 130 has three openings 131, 135, 137 dynamically positioned at angular positions offset from the optical axes 101, 103 and 105, they are aligned with the openings 108, 109, 111 of the first shutter. The second shutter 130 is rotated in the clockwise direction 168 at a synchronous speed of $\Omega_0$. It is seen that the synchronous "armed" positions of the first and second shutters 100, 130 maintain the "closed" status of the shutter assemblies, despite that the openings 121, 125, 127 in the third shutter 120 are registered with the optical axes at the selected instant. FIG. 11A illustrates the third shutter 120 having openings 121, 125 and 127, that are dynamically aligned at the optical axes 101, 103 and 105 of the apparatus's exterior apertures. The third shutter 120 is rotated in the clockwise direction 166 at the synchronous speed of $\Omega_0/3$.

The drawing figures illustrate an embodiment of the apparatus of the invention in which the third shutter 120 is disposed intermediate to the first and second shutters 100, 130. It should be noted, however, that the order of the shutters along their common rotational axis is not critical. For instance, the inventive apparatus would function suitably with the second shutter 130 disposed between the first shutter 100 and the slower-rotating third shutter 120. Or, the slower-moving third shutter 120 alternatively could be closest to the blast source 144, with the first shutter 100 between it and the second shutter 130.

FIGS. 10A, 11A and 12A show the dynamic shutters' angular positions (for each full revolution of each shutter opening about center 102), with the shutters rotating at synchronous speeds of $\Omega_0$ and of $\Omega_0/3$, as previously explained, whereby the respective openings of the first and second shutters are aligned at the angle of $\phi_0$ (48, 68, providing rotation phase lock). The $\phi_0$ denotes the angle in the plane of the shutter rotation 102 between the line that connects the center of rotation 102 and optical axis 101, and the line that connects center of rotation 102 and center of opening 108 or 131. At this angle, the openings 108, 109, 111 and 131, 135, 137 are not aligned with any optical axis (and thus no exterior aperture), providing a complete occlusion or closure of the exterior apertures during rotation of the shutters.

The controller 140 locks the "armed" phases of the shutters' rotations by processing the feedback signals from the encoders 112, 128, and 134. Controller 140 thus maintains a synchronous speed of $\Omega_0$ (at phase lock $\phi_0$) of the first and second shutters 100 and 130 through the amplifiers 110 and 138 by regulating the excitation currents in the driving stators 104, 106 and 132, 136, respectively. Likewise, controller 140 maintains the synchronous speed of $\Omega_0/3$ (phase lock $\phi=0$) of the shutter 120 through the amplifier 126, regulating the excitation currents in the driving stators 122, 124. This dynamic state of shutter rotation represents the apparatus's condition when it is ready (armed state) to perform an exposure operation. Exposure can be requested by an external control circuit of the source 114 or manually by an operator.

As described previously for the preferred embodiment, there are at least two available modes to trigger shutter mechanism exposure: asynchronous and synchronous. In the asynchronous mode, the controller 140 awaits an exposure request signal from an external source or an operator's input 149 to perform an exposure action. Because the exposure request event may happen at any time, the positions of the nine openings of three shutters likely will be wholly out of the phase of $\phi_0$. Therefore, the controller 140 delays initiating the exposure procedure until two openings of the first and second shutters 100, 130 co-register at the angle $\phi_0$, and the openings of the third shutter 120 register with the optical axes 101, 103, 105, as shown in FIGS. 10A, 11A, 12A. At this moment the controller 140 generates a ready signal on line 143 to notify the explosive control circuits respecting the exposure event. At the same time, the controller 34 sets the digital data lines 145 to an estimated apertures exposure preceding time interval for a precise time pulsing synchronization. The explosive control circuit may adjust its blast time event according to a given time interval, or simply ignore the ready signal to abort the requested aperture exposure event from the shutter apparatus.

In the synchronous operation mode, at each rotation of the first or second shutter 100 or 130, the controller 140 generates a short pulse (time mark) that corresponds to that shutter's certain angular position, as shown in FIG. 8. The controller 140 awaits a confirmation signal from control circuits of an external source, ordinarily the blast or pulse source 144, during a time window $t_w$. The time window $t_w$ for detecting a confirmation signal is computed generally as described above for the preferred embodiment of the apparatus. The external source must respond during the time window if the aperture exposure action will be performed. The confirmation signal shares the same control line 142 with the asynchronous trigger signal. If the confirmation signal is not received during the time window $t_w$, the controller/processor reverts into a standby state for this operation until the next time mark is generated.

The shutter apparatus exposure procedure begins when the following conditions are met: (1) the controller 140 receives an exposure request signal (asynchronous mode) and a confirmation signal (synchronous mode), and (2) two openings (e.g. 108 and 131 in the first and second shutters are aligned at the angle $\phi_0$, and an opening (e.g. 121) aligns with an optical axis (e.g. 101). As with the two-shutter embodiment, it is required that both shutters 100 and 130 rotate at the synchronous angular speed before an exposure action and the apertures exposure is performed by adding and removing only a small portion of the initial rotational kinetic energy of first and third shutters respectively.

The invention permits controlled exposure of sensitive instruments 150 aligned with one, two, or all three optical axes 101, 103, 105 to emissions from the blast or pulse origin 144. The angular speeds of the shutters are computed using the most recent readings of absolute angular positions of shutters 100, 120, 130 by the optical encoders 112, 128, and 134, respectively.

Figure 12B:
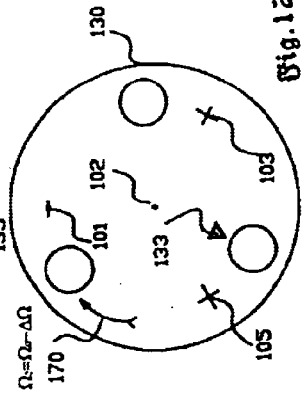
Figure 10B:
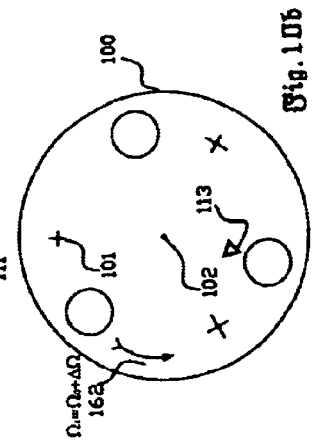

During the exposure procedure, the angular speed $\Omega_0/3$ of the third shutter 120 is maintained, and the position of that shutter monitored by the controller/processor via encoder 128. The angular speed of the first shutter 100 is gradually increased to the value of $\Omega_1=\Omega_0+\Delta\Omega$ while the angular speed of the second shutter 130 is gradually decreased to the $\Omega_1=\Omega_0-\Delta\Omega$ during the exposure procedure. The absolute value of $\Delta\Omega$ is calculated by the controller 140, based on the requirement to synchronously bring three shutter openings into phased registration with the exterior apertures of the overall apparatus, so that all the openings and apertures will be aligned along the optical axes 101, 103, 105. The transient opening locations for all shutters are illustrated in FIGS. 10B, 11B, and 12B respectively. The fiducial marks 113, 123, and 133 help recognizing the disks' rotational phase. As the figures illustrate, the first shutter 100 has the angular speed of $\Omega_1>\Omega_0$ (162), and turns through the angle of $\phi_1=2\pi+\phi_0$ from the initial locked phase position, where $\phi_1$ is the angle between the line 42 (see FIG. 10C) and the line that connects the center of disc rotation and the opening center that is marked by triangular 113 in the counterclockwise direction. At the same time, the second shutter 130 is decelerated to the angular speed of $\Omega_3<\Omega_0$ (170), as it turns through the angle of $\phi_3=2\pi-\phi_0$ from the locked phase position, where $\phi_3$ is the angle between the line 62 (see FIG. 12C) and the line that connects the center of disc rotation and the opening center that is marked by triangular 133 in the clockwise direction.

Figure 12C:
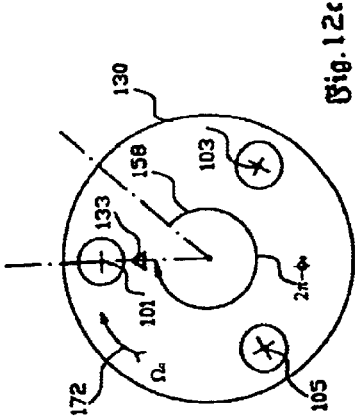
Figure 10C:
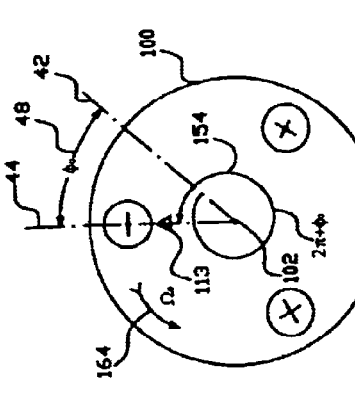

Referring to FIGS. 10C, 11C and 12C, it is seen that exposure occurs when the first shutter 100 opening, which is marked by 113, turns to a first shutter exposure angle $\phi_1$ wherein $\phi_1=2\pi+\phi_0$. The third shutter 120, still rotating at speed $\Omega_0/3$, turns to second shutter exposure angle $\phi_2$, wherein $\phi_2=2\pi/3$, as marked by triangular 123. Also in the same time interval, second shutter 130 opening, which is marked by 133, turns to third shutter exposure angle $\phi_3$, where $\phi_3=2\pi-\phi_0$. The phase shifts to adjust the angular positions of the openings 108, 109, 111, 121, 125, 127, 131, 135, 137 to their exposure positions preferably occur within one revolution of the first 100 and second 130 shutters.

Consequently, three exterior apertures of the device (not shown in the FIG. 9 and analogous to 40 and 42 in FIG. 1) and all shutter openings are aligned coaxially along the optical axes 101, 103, and 105, thus providing conduits permitting the passage there-through of radiation to the one or more separately disposed equipment(s) 150. This step ends the exposure operation of the shutter apparatus. To complete the cycle, the shutters 100, 120, 130 are returned to the "armed" state. That state or condition is characterized by the following parameters: the synchronous angular speed $\Omega_0$ of the first and second shutters, the rotational phase lock angle $\Omega_0$ of the openings, and the angular speed $\Omega_0/3$ and its phase $\phi=0$ for the third shutter. The exposure operation changes the angular speeds and phase of rotation of the first and second shutters 100, 130. The first and second shutters' angular speeds after the exposure procedure became $\Omega_1=\Omega_0+\Delta\Omega$ and $\Omega_3=\Omega_0-\Delta\Omega$ for respectively. Since $\Omega_1 \neq \Omega_3$, the rotational speed of the shutters 100 and 130 is no longer synchronous and the openings alignment angle is different after each full revolution of the shutters.

The reset procedure to return the apparatus to its initial state is performed in reverse order to the exposure procedure steps. Combined reference is made to FIGS. 13A-C, 14A-C and 15A-C. In sum, the reset method comprises the following steps. In a first step the current angular speeds $\Omega_1$ and $\Omega_2$ of the first and second shutters 100, 130 are computed using two recent readings of the absolute angular position of both shutters from the optical encoders 112 and 134, respectively. The angular speed of the first shutter 100 is gradually decreased and the angular speed of the second shutter 130 is gradually increased to $\Omega_0$ during the reset procedure. The magnitude of $\Delta\Omega$ is calculated by the controller/processor 140 based on the requirement to simultaneously turn the openings in the first and second shutters 100 and 130 openings to the phase lock angular position of $\phi_0$, at the initial synchronous speed of $\Omega_0$, as seen in FIGS. 13C and 15C. As can be seen from FIGS. 13C and 15C, the first shutter 100 must turn to return or reset angle of $\psi_1$, where $\psi_1=2\pi-\phi_0$, to return to the openings phase lock position. During this return, the angular speed of the first shutter will be gradually decreased on value $\Delta\Omega$ to reach the original synchronous speed $\Omega_0$ at the end of reset operation. The second shutter 130 also turns to return to reset position $\psi_3$, where $\psi_3=2\pi+\phi_0$, to reach the openings phase lock position. The angular speed of the second shutter 130 is gradually increased on value $\Delta\Omega$ during the reset operation, thereby to reach the original synchronous speed of $\Omega_0$. The transient locations for the openings in all three shutters, during the reset operation, are depicted in FIGS. 13B, 14B and 15B respectively. The angular speed of the third shutter 120 remains unchanged during the exposure operation.

As a result, the openings in both shutters 100 and 130 align at the angle of $\phi_0$, as shown in FIGS. 13C and 15C, while rotating at the synchronous speed of $\Omega_0$. This completes the shutter mechanism aperture exposure-reset operation cycle and returns to its initial armed and closed state.

The basic method of the invention is apparent from the foregoing. The method for ultra-fast aperture exposure thus includes the steps of defining an optical axis, rotating a first shutter and a second shutter coaxially in opposite directions at a selected synchronous speed $\Omega_0$ thereby to dynamically align openings in the shutters in phase at a first angle $\phi_o$ from the optical axis, computing the angular speed of the first and second shutters, and increasing the angular speed of the first shutter by a selected amount $+\Delta\Omega$ while decreasing the angular speed of the second shutter by substantially the same selected amount $-\Delta\Omega$. These steps shift the phase of rotation of the first shutter by $2\pi+\phi_o$ and the phase of the second shutter by $2\pi-\phi_o$, thus dynamically aligning the shutter openings with the optical axis to perform the ultra-fast exposure, which just as rapidly may be ended by dynamically aligning the shutter openings at a position offset from the optical axis.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for ultra-fast aperture exposure, comprising:
   at least one optical axis;
   at least two shutters comprising a first shutter and a second shutter, each of said shutters defining at least one opening therein, said shutters rotatable coaxially in opposite directions at a selected synchronous speed $\Omega_0$ thereby to dynamically align said openings in phase at a first angle $\phi_o$ from said optical axis;
   means for computing the angular speed of said first and second shutters; and
   means for increasing the angular speed of said first shutter by a selected amount $+\Delta\Omega$ while decreasing the angular speed of said second shutter by substantially the same selected amount $-\Delta\Omega$, to shift the phase of rotation of said first shutter by $2\pi+\phi_o$ and the phase of said second shutter by $2\pi-\phi_o$, thereby to dynamically align said shutter openings with said optical axis.

2. An apparatus according to claim 1 wherein said means for computing comprises optical encoders.

3. An apparatus according to claim 1 wherein each of said first and second shutters defines only one opening therein.

4. An apparatus according to claim 1 wherein said shutters are rotatable through multiple complete rotations to effectuate said shutter rotation phase shifts.

5. An apparatus according to claim 1, wherein each of said first and second shutters defines x number of openings therein, wherein x is a fixed integer greater than one, and further comprising:
   at least two optical axes;
   a masking third shutter rotatable coaxially with said first and second shutters, said third shutter defining x number of openings therein, said third shutter rotatable at a selected synchronous speed $\Omega_0/x$ in a direction opposite from the rotation direction of one of said first and second shutters, and wherein each of said three shutters defines openings therein having an angular separation of $2\pi/x$; and
   means for computing the angular speed of said third shutter;
   wherein when an opening on said first shutter is aligned with an opening on said second shutter, all openings in any selected shutter are aligned with respective ones of said openings in said other two shutters, and with at least two of said optical axes.

6. An apparatus according to claim 5 wherein said optical axes are x in number.

7. An apparatus for ultra-fast aperture exposure, comprising:
   an exterior aperture on an optical axis;
   a first shutter and a second shutter, each of said shutters defining an opening therein, said shutters rotatable coaxially in opposite directions at a selected synchronous speed $\Omega_0$ thereby to dynamically align said openings in phase at a first angle $\Omega_o$ from said optical axis;
   means for computing the angular speed of the first and second shutters; and
   means for increasing the angular speed of said first shutter by a selected amount $+\Delta\Omega$ while decreasing the angular speed of said second shutter by substantially the same selected amount $-\Delta\Omega$, to shift the phase of rotation of said first shutter by $2\pi+\phi_o$ and the phase of rotation said second shutter by $2\pi-\phi_o$, thereby to dynamically align both said shutter openings with said exterior aperture and said optical axis.

8. An apparatus according to claim 7 wherein said means for computing comprises optical encoders.

9. An apparatus according to claim 7 wherein said shutters rotate through multiple complete rotations to effectuate said phase shifts.

10. An apparatus for ultra-fast aperture exposure, comprising:
    at least x number of optical axis, where x is a fixed integer greater than one;
    at least three shutters comprising a first shutter, a second shutter, and a third masking shutter, each of said shutters defining therein at least x number of symmetrically arrayed openings having angular separations of $2\pi/x$, said first and second shutters rotatable coaxially in opposite directions at a selected synchronous speed $\Omega_0$ thereby dynamically to align said openings in phase at a first angle $\phi_o$ from said optical axis, and a masking third shutter rotatable coaxially with said first and second shutters, said third shutter rotatable at a selected constant synchronous speed $\phi_0/x$ in a direction opposite from the rotation direction of either of said first and second shutters;
    means for computing the angular speed of said first and second shutters;
    means for increasing the angular speed of said first shutter by a selected amount $+\Delta\Omega$ while decreasing the angular speed of said second shutter by substantially the same selected amount $-\Delta\Omega$, to shift the phase of rotation of said first shutter by $2\pi+\phi_o$ and the phase of said second shutter by $2\pi-\phi_o$, thereby to dynamically align an opening in each of said first and second shutters with a corresponding one of said optical axes;
    wherein when an opening on said first shutter is aligned with an opening on said second shutter, all openings in any selected shutter are aligned with respective ones of all said openings in said other two shutters, and with said optical axes.

11. A method for ultra-fast aperture exposure comprising the steps of:
    defining at least one optical axis;
    rotating a first shutter and a second shutter coaxially in opposite directions at a selected synchronous speed $\Omega_0$ thereby to dynamically align openings in the shutters in phase at a first angle $\phi_o$ from the optical axis;

computing the angular speed of the first and second shutters; and increasing the angular speed of the first shutter by a selected amount $+\Delta\Omega$ while decreasing the angular speed of the second shutter by substantially the same selected amount $-\Delta\Omega$, thereby shifting the phase of rotation of the first shutter by $2\pi+\phi_o$ and the phase of the second shutter by $2\pi-\phi_o$, to dynamically align the shutter openings with the optical axis.

12. The method of claim 11 wherein the computing step comprises using optical encoders.

13. The method of claim 11 comprising defining only one opening in each of the first and second shutters.

14. The method of claim 11 comprising rotating the shutters through multiple complete rotations to effectuate the shutter rotation phase shifts.

15. The method of claim 11, further comprising:

defining x number of openings in each of the first and second shutters, wherein x is a fixed integer greater than one;

defining x number of optical axes;

rotating a masking third shutter coaxially with the first and second shutters and at a selected synchronous speed $\Omega_0/x$ in a direction opposite from the rotation direction of one of said first and second shutters, the third shutter defining x number of openings therein;

defining in each of the three shutters openings having angular separations of $2\pi/x$; and aligning all openings in any selected shutter with respective ones of the openings in the other two shutters and with the optical axes.

* * * * *